(12) United States Patent
Bangar et al.

(10) Patent No.: US 11,990,274 B2
(45) Date of Patent: May 21, 2024

(54) ELECTROMAGNETIC SOLENOID ACTUATOR AND METHOD FOR OPERATION OF AN ELECTROMAGNETIC SOLENOID ACTUATOR

(71) Applicant: Dana Automotive Systems Group, LLC, Maumee, OH (US)

(72) Inventors: Sagar B. Bangar, Ypsilanti, MI (US); Michael Z. Creech, Ann Arbor, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 187 days.

(21) Appl. No.: 17/382,187

(22) Filed: Jul. 21, 2021

(65) Prior Publication Data

US 2023/0026552 A1  Jan. 26, 2023

(51) Int. Cl.
| | | |
|---|---|---|
| *H01F 7/16* | (2006.01) | |
| *F16D 27/108* | (2006.01) | |
| *F16H 48/34* | (2012.01) | |
| *H01F 7/08* | (2006.01) | |

(52) U.S. Cl.
CPC ............. *H01F 7/16* (2013.01); *F16D 27/108* (2013.01); *F16H 48/34* (2013.01); *H01F 7/081* (2013.01); *F16H 2048/346* (2013.01)

(58) Field of Classification Search
CPC .... F16H 48/34; F16H 2048/346; F16H 48/20; F16H 2048/204; F16H 48/24; F16H 48/08; F16D 27/108; F16D 27/10; F16D 27/118; F16D 27/14; H01F 7/16; H01F 7/081; H01F 2007/185; H01F 7/1844; H01F 7/17; H01F 7/14; H01F 7/121; H01F 7/124

See application file for complete search history.

(56) References Cited

U.S. PATENT DOCUMENTS

| | | | |
|---|---|---|---|
| 4,599,593 A | 7/1986 | Minks | |
| 6,765,463 B2 | 7/2004 | Mader et al. | |
| 9,396,860 B1 * | 7/2016 | Wright | ................... F16D 27/118 |
| 9,420,379 B2 | 8/2016 | Kim et al. | |
| 2017/0159726 A1 * | 6/2017 | Creech | .................... F16D 11/14 |
| 2018/0080799 A1 * | 3/2018 | Creech | ............... G01R 33/0082 |
| 2018/0301264 A1 * | 10/2018 | Beuschel | ............ F16K 31/0682 |
| 2019/0118690 A1 * | 4/2019 | Beuschel | ............ F16K 31/0627 |
| 2019/0148045 A1 * | 5/2019 | Tsuzuki | ..................... H01F 7/14 |
| | | | 335/209 |
| 2019/0368592 A1 * | 12/2019 | Gostin, Jr. | .............. F16H 48/34 |

FOREIGN PATENT DOCUMENTS

JP  2004116730 A  *  4/2004  ............. F16D 48/06

* cited by examiner

*Primary Examiner* — Tisha D Lewis
(74) *Attorney, Agent, or Firm* — McCoy Russell LLP

(57) ABSTRACT

Methods and systems are provided for operating a solenoid actuator to engage and/or disengage a torque transmission member of a vehicle transmission. In one example, a method may include increasing the holding force of the solenoid actuator. Additionally, the solenoid actuator may include a translatable structural element that creates a moment upon touching another structural element holding the translatable element in a locked position.

13 Claims, 11 Drawing Sheets

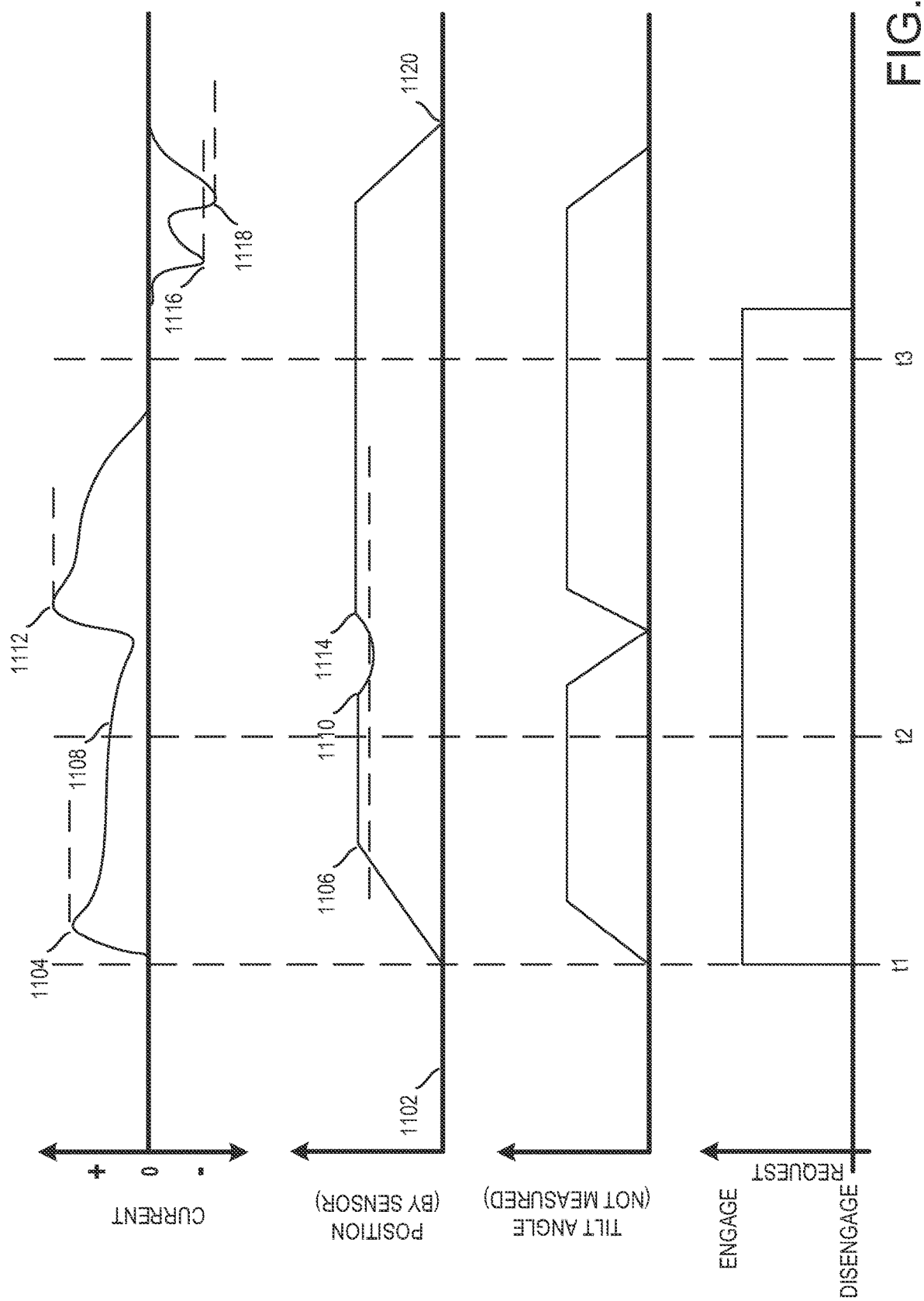

ELECTROMAGNETIC SOLENOID ACTUATOR AND METHOD FOR OPERATION OF AN ELECTROMAGNETIC SOLENOID ACTUATOR

TECHNICAL FIELD

The present disclosure generally relates to a locking mechanism in a vehicle. More particularly, the present disclosure relates to a solenoid actuator as well as control of the actuator for locking a torque transmitting element in the vehicle.

BACKGROUND AND SUMMARY

Some drivetrains include transmission elements with locking capabilities which when activated, engage two members to rotate together. In some examples, electronic actuators are used where an electromagnetic solenoid overcomes a biasing spring to effect movement that causes the engagement, or disengagement. Electronic actuators may provide quicker actuation times and increased durability in comparison to certain pneumatic locking systems and other types of locking mechanisms However, the inventors herein have recognized a potential drawback of such actuators when operating the actuator to maintain engagement for an extended period of vehicle operation. Engaging some electronic actuators draws a flow of current through the actuator to maintain position against a return spring of the actuator. Sustained electrical current may result in thermal degradation of the actuator coil as well as increased energy usage of the vehicle In one example, the issues described above may be addressed by a method, comprising: operating a solenoid actuator to engage and/or disengage a torque transmission member of a vehicle transmission, the solenoid actuator including a translatable structural element to effect the engagement and/or disengagement, where the translatable structural element is linearly moved until it touches a surface that creates a moment that tilts the structural element to lock the structural element in place. In this way, a holding force of the actuator is increased without demanding greater current draw.

As one example, the electromagnetic solenoid actuator may be operated by increasing an electrical current magnitude, and then reducing the current magnitude with the structural element still in place. In one example, the structural element may include a pole-piece, a plunger, and a cover plate, which operate to engage and/or disengage a clutch or gear in a differential system. In an example, forces offset from a center of the structural element cause the element to become angled at a selected position (e.g., engaged or disengaged) and become locked in position via the frictional and other forces that create a self-locking clutch that thus holds the plunger in a locked position of engagement (or disengagement) without drawing additional current and enabling reduced current.

In an example, unlocking the actuator involves supplying a reverse current to the actuator and is further assisted by a spring force, as an example. In one example, a current level required to lock or unlock the actuator may be learned and stored in a controller. In this way, a faster response to engage and/or disengage requests can be achieved. Further, the possibility of actuator degradation due to heat may be further reduced and customer appeal may be correspondingly increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 11 shows a timing diagram for example prophetic operation of an electromagnetic solenoid actuator to engage and/or disengage a torque transmission member of a vehicle transmission according to the methods of FIGS. 8-10.

FIGS. 1-8 are drawn approximately to scale, except where indicated otherwise. However, other relative component dimensions may be used, in other embodiments.

DETAILED DESCRIPTION

Figure 1:
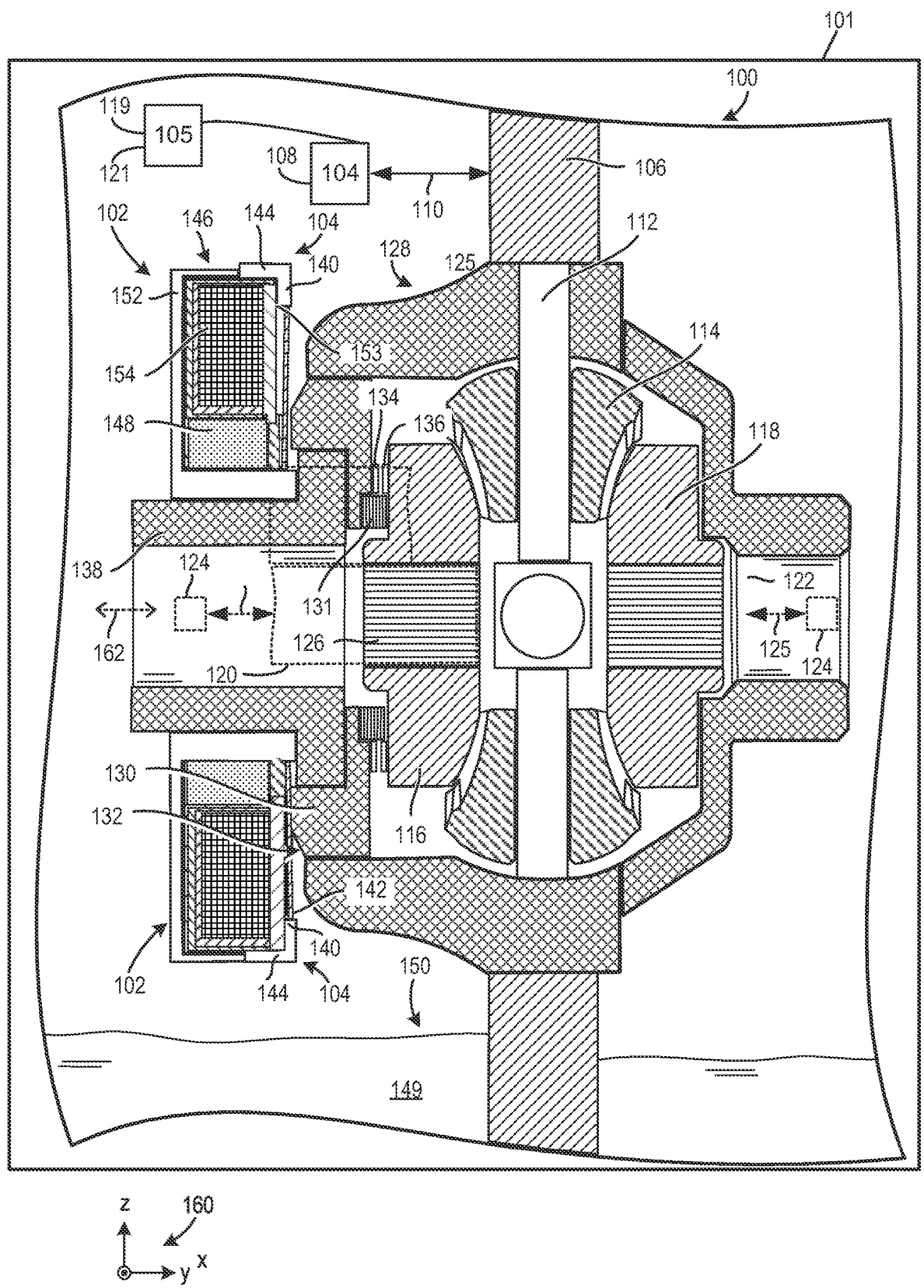
FIG. 1 shows a cross-sectional illustration of an embodiment of a differential system with a circuit board assembly.
Figure 2:
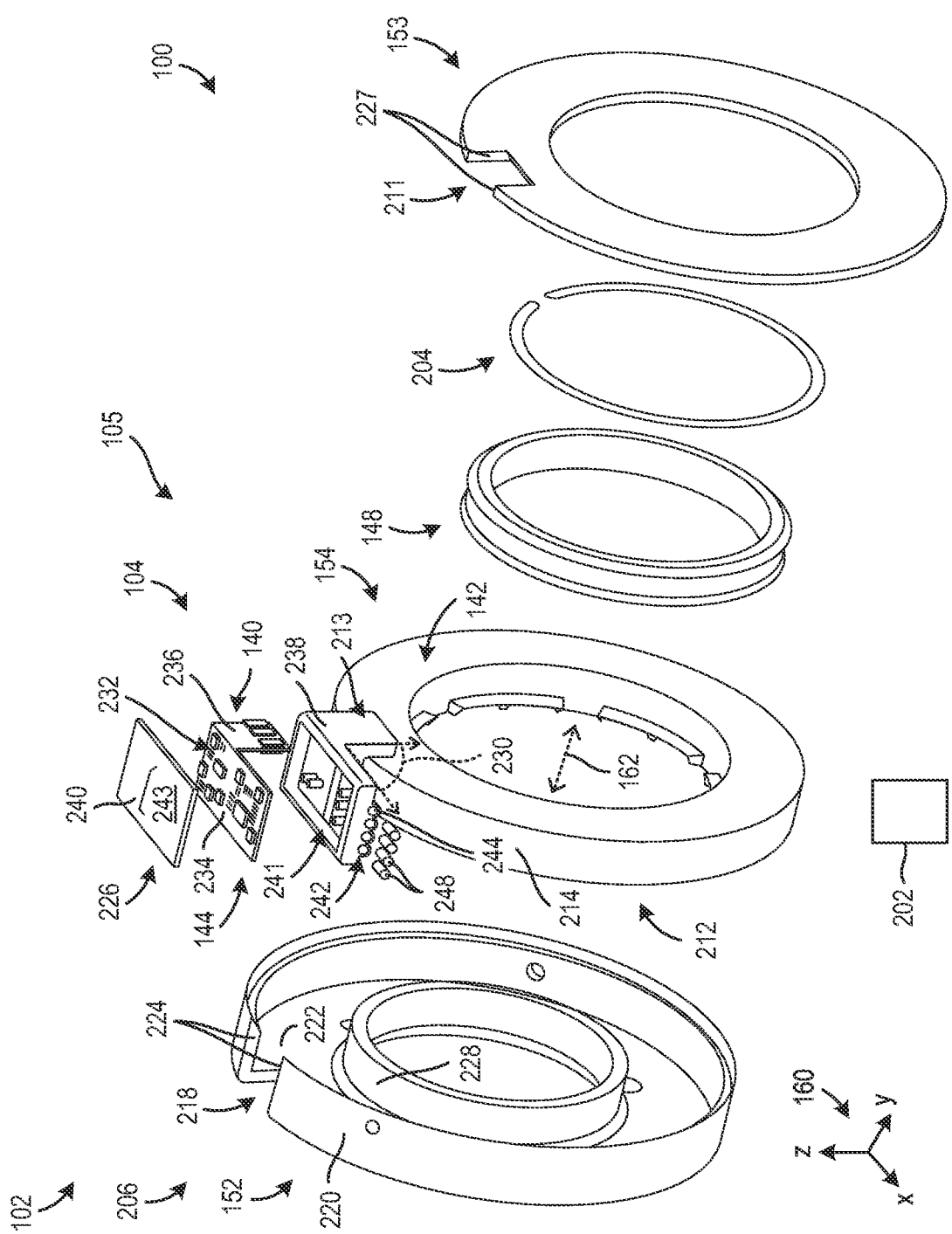
FIG. 2 shows an exploded view of the differential system and circuit board assembly, depicted in FIG. 1.
Figure 8:
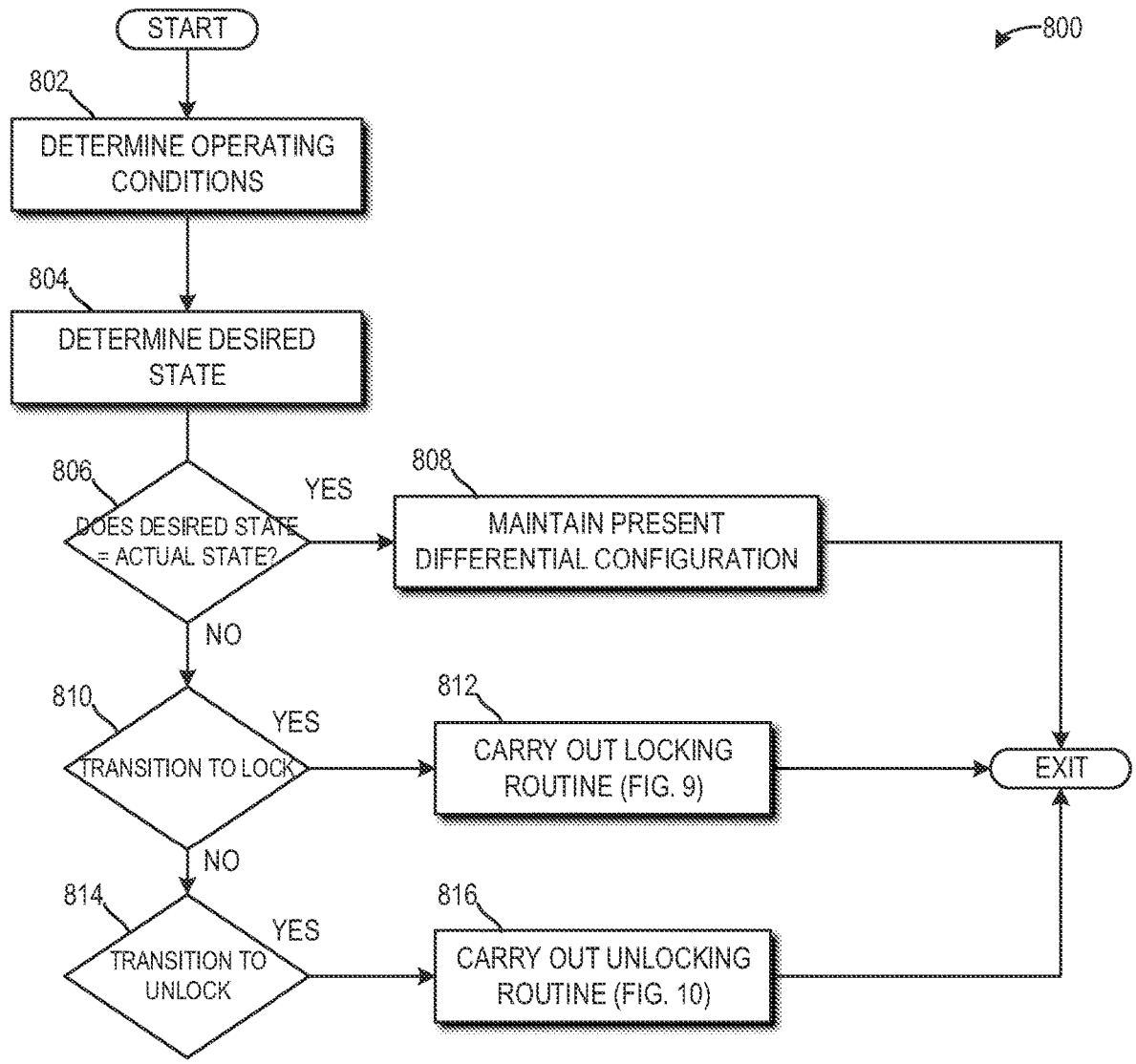
FIG. 8 shows a method for operation of an electromagnetic solenoid actuator to engage and/or disengage a torque transmission member of a vehicle transmission.
Figure 9:
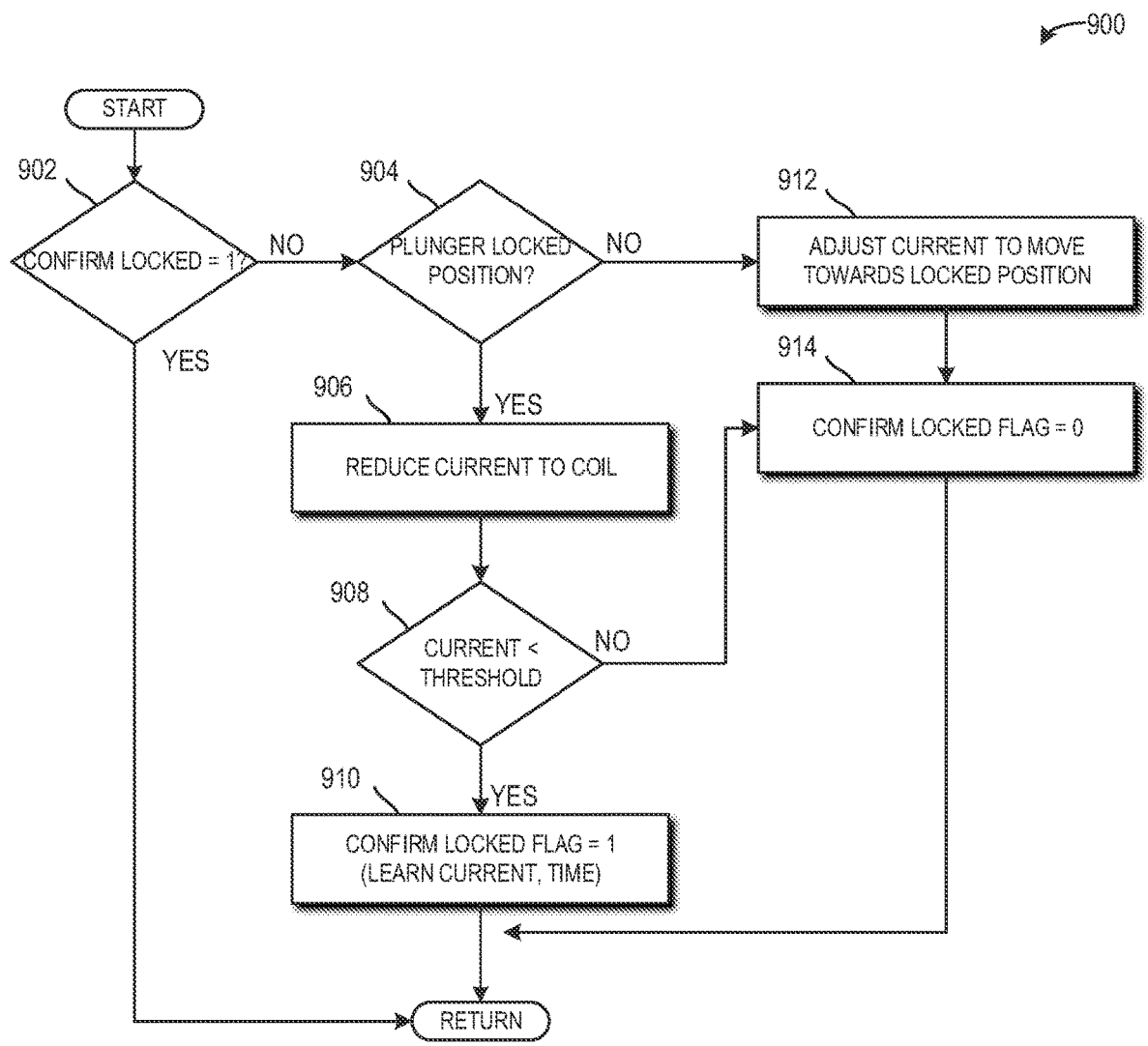
FIG. 9 shows a method for operation of an electromagnetic solenoid actuator to engage a torque transmission member of a vehicle transmission.
Figure 10:
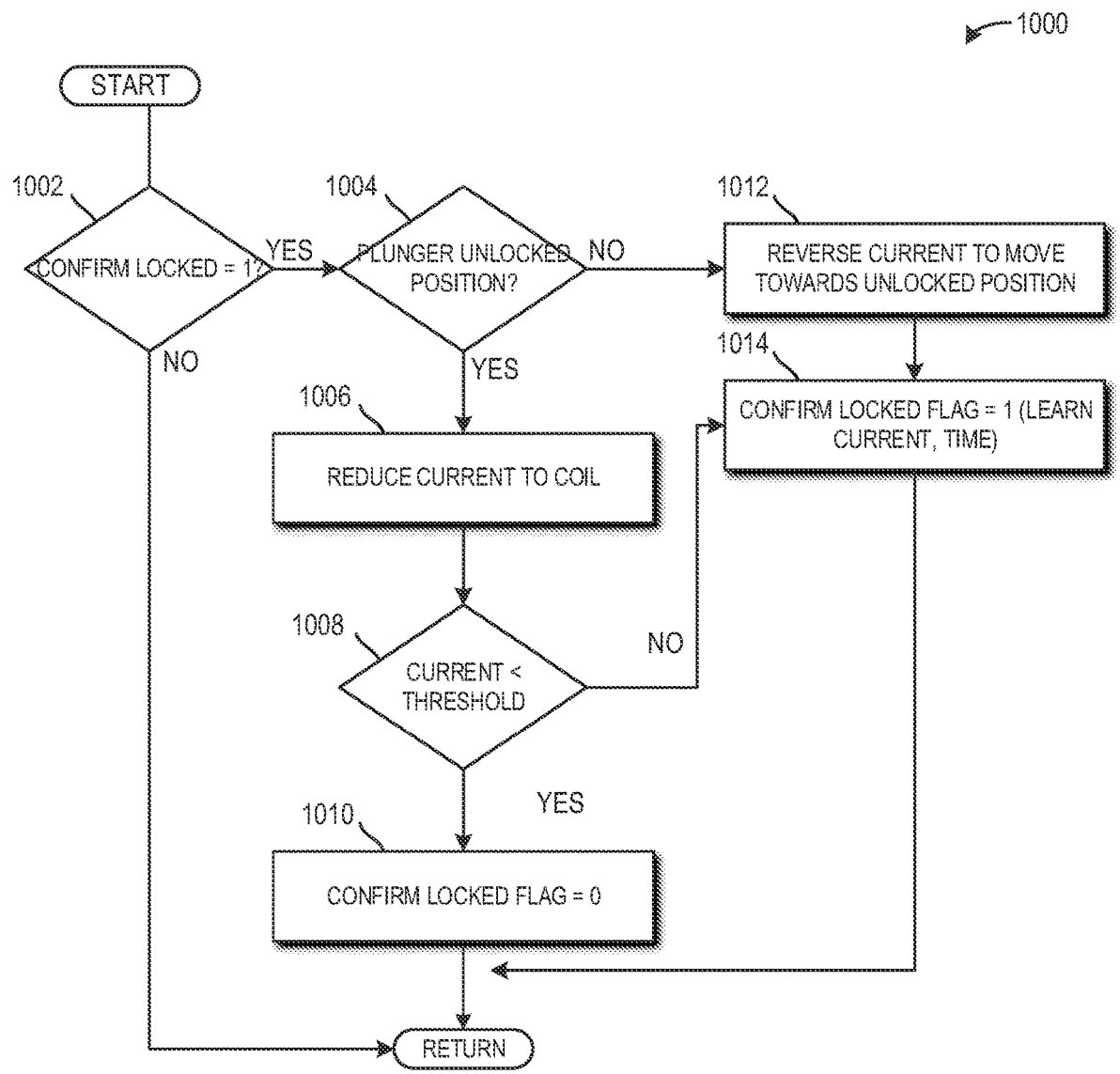
FIG. 10 shows a method for operation of an electromagnetic solenoid actuator to disengage a torque transmission member of a vehicle transmission.

The following description relates to a solenoid actuator. The solenoid actuator may be positioned in various devices, such as a torque transmission member of a vehicle transmission, to actuate a movable member. In one example, the electromagnetic solenoid actuator is shown in the differential system of FIG. 1 in the form of an annulus configured to actuate a clutch. An exploded view of the example annulus-shaped solenoid actuator of FIG. 1 is illustrated in FIG. 2. FIGS. 3-7 show a cross-section of the solenoid of FIG. 2 in various states of actuation. The actuator may be controlled by a control system including various sensors according to the methods of FIGS. 8-10. Example prophetic operation according to the method of FIGS. 8-10 is illustrated in FIG. 11.

In one example, a solenoid actuator includes a housing with a plunger and pole-piece to control the magnetic force. Some approaches for providing actuation maintain linear motion of the plunger (and thus avoid tilting and/or binding) before and after contact with the pole-piece. Likewise, such an approach generally aims to reduce excess friction. However, holding forces may require maintenance of electrical current against a return bias spring, and thus can increase energy usage and/or the number of coil turns. As described herein, friction is used to advantage to enable holding the plunger in a select position with reduced current, even in the presence of bias forces.

For example, the system may take advantage of tilting and binding of an element of the actuator, such as the pole-piece (for example, a cover plate) or the plunger, or another entity (for example, a washer) between them. In an example, geometric features can be provided, such as angled surfaces that are angled as compared to the linear movement of the solenoid, such that when the plunger makes contact with the entity (directly or indirectly), the plunger is forced to tilt, thus increasing the normal force between the plunger and housing, for example. The offset forces can maintain the tilt or binding of the element and create a self-locking system that holds the position until forcibly unlocked, such as through reverse actuation of the actuator.

In an example, when the solenoid coil is energized, the plunger starts moving towards the cover plate. Upon contact, such as due to an angled surface, the plunger will try to make face to face contact with the cover plate and/or since the plunger will try to mitigate the airgap due to electromagnetic force, the plunger tilts or attempts to tilt, which will increase the normal force between the plunger and the housing. This increased normal force increases the total frictional force between housing and plunger since frictional force is directly proportional to the normal force. This increased frictional force will help to hold the plunger engaged with a higher total holding force that is the additive force of electromagnetic force and frictional force. The plunger may then remain locked in an engaged position with reduced, or no, current.

In an example, disengaging the plunger is achieved by increasing current to the actuator in an opposite direction to the engaging current sufficient to overcome the locked position frictional force. In this example, the magnitude of reverse current to unlock the plunger may be smaller than that which locks the plunger, due to the direction of the spring force. In this way, the overall electrical current to the system may be reduced.

FIG. 1 shows a differential system 100 (e.g., locking differential system). The differential system 100 may be included in a vehicle schematically depicted at 101. The vehicle 101 may be a light, medium, or heavy duty vehicle. The differential system 100 includes an electromagnetic solenoid actuator 102 designed to induce engagement and disengagement of a differential locking mechanism further described herein. The differential locking mechanism may include components such as a locking plate designed to engage and disengage speed differentiation between the differential's side gears. As described herein, when the differential is locked, speed differentiation between axle shafts is substantially inhibited and when the differential is unlocked, speed differentiation between the axle shafts is permitted The solenoid actuator 102 may be coupled to a body section 138. A circuit board assembly 104 is further provided in the differential system 100. The circuit board assembly 104 includes control circuitry 144 and a sensor 140. The circuit board assembly 104 arranges a sensor 140 down a face 142 of the solenoid actuator 102. Control circuitry 144 may again laterally extend across a top side 146 of the solenoid actuator 102. In this way, the circuit board assembly 104 may be spaced away from lubricant 149 (e.g., oil) which is stored in a lubricant reservoir 150 (e.g., sump) of an axle housing. Consequently, the likelihood of the lubricant interfering with circuit operation is reduced.

A housing 152 and a cover plate 153 of the solenoid actuator 102 is further depicted in FIG. 1. In one example, the housing 152 is shaped as an annulus. In one example, the cover plate 153 is fixed to the housing and having a protrusion. The housing 152 at least partially encloses a coil assembly 154 in the solenoid actuator. Specifically, the housing 152 seals the coil assembly 154 and the circuit board assembly 104 to the solenoid actuator. The housing 152 encloses a plunger. In one example the cover plate 153 has a protrusion that interacts with the plunger to form a contact region offset from a centroid of a cross-section of the plunger. The plunger is coupled in a vehicle transmission component. In one example the plunger is a piston 148 and the vehicle transmission component is a locking device 132.

The sensor 140 is designed to sense the position of the piston 148 in the solenoid actuator 102. Specifically, in one example, the sensor 140 may be an eddy current sensor. However, other suitable sensors have been envisioned. Thus, the sensor 140 may send signals indicative of the piston 148 position to the control circuitry in the circuit board assembly. The sensor 140 may extend down a first face 142 of the solenoid actuator 102. In this way, the sensor 140 may be arranged in a desired orientation to achieve targeted solenoid sensing functionality. To elaborate, the sensor 140 may be arranged parallel to the plane of the solenoid actuator face 142.

The circuit board assembly 104 may be in electronic communication with a controller 105 (e.g., electronic control unit (ECU)) via wired and/or wireless communication. The controller 105 may therefore be spaced away from the circuit board assembly. The controller 105 may be designed to implement control strategies such as engine control, motor control, powertrain control, and the like. The circuit board assembly 104 may send rapidly distinguishable messages, such as messages indicating the circuit board assemblies state (e.g., activated higher power consuming state or a lower power consuming state (sleep state)), to the vehicle controller. To accomplish the aforementioned vehicle control functionality, the vehicle controller may include a memory 119 storing instructions executable by a processor 121 to carry out the vehicle control strategies.

The differential system 100 may include a gear 106 (e.g., ring gear) which may be coupled to a drivetrain gear (e.g., pinion gear). The gear 106 may be rotationally coupled to a prime mover (e.g., internal combustion engine, motor, combinations thereof, and the like) schematically depicted at 108. Arrows 110 indicate the flow of power between the prime mover 108 and the gear 106.

The gear 106 is coupled to a shaft 112 on which gears 114 (e.g., pinion gears) reside. The gears 114 are coupled to side gears 116, 118. In turn, the side gears 116, 118 are coupled to axle shafts 120, 122 (a pair of axle shafts) which may be rotationally coupled to drive wheels 124 indicated via arrows 125. Splines 126 and/or other suitable attachment interfaces may facilitate attachment between the axle shafts and the side gears 116, 118. The differential system 100 may further include a case 128 coupled to the gear 106.

A locking gear 130 in the locking device 132 of the differential system 100 may be actuated via the solenoid actuator 102. Thus, the locking gear 130 may be placed in an unlocked, or disengaged, position and a locked, or engaged, position via the actuator. In the unlocked position, teeth 134 in the locking gear 130 are spaced away from teeth 136 in the side gear 116, in one example. Continuing with such an example, conversely, in the locked position, the teeth 134 in the locking gear 130 are mated with the teeth 136 in the side gear 116. In this way, the differential may be locked and unlocked via the locking device 132. However, other suitable types of locking mechanisms have been contemplated. The differential system may further comprise a spring 131 arranged between the locking gear 130 and the side gear 116. The springs function to return the locking gear to an unlocked position. However, other locking device configurations have been contemplated.

An axis system 160 is provided in FIG. 1 as well as FIGS. 2-8, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples. A central axis 162 of the differential system 100 is further provided in FIG. 1 and FIGS. 2-7, for reference. It will be understood that the central axis 162 may be the rotational axis of the axle shafts in the differential system. As described herein, axial movement may refer to a component's movement along a direction parallel to the central axis.

A control system including controller 105 is configured to perform actuator control routines, such as example routines of FIGS. 8, 9 and 10, and receive sensor signals, such as from the sensor 140. In one example, the vehicle controller may operate a routine to change a gear state of a set of gears.

While FIG. 1 illustrates the solenoid actuator in a locking differential, other applications are also contemplated, such as an actuator for shifting gears of a transmission.

FIG. 2 shows further details of the solenoid actuator 102. As described further herein, the electromagnetic solenoid actuator may include a translatable structural element to effect engagement or disengagement of the differential. In one example, the structural element may include a plunger, a pole-piece, and a cover plate. In one example, the electromagnetic solenoid actuator comprises a housing, a coil and a plunger.

Referring now specifically to FIG. 2, the electromagnetic solenoid actuator 102 and the circuit board assembly 104 are depicted in an exploded view. As indicated above, the solenoid actuator 102 is designed to trigger differential locking and unlocking (engagement/disengagement). The electromagnetic solenoid actuator 102 includes a coil assembly 154 and the piston 148. The coil assembly 154 is electrically coupled to an energy source 202 (e.g., battery, capacitor, alternator, etc.). The coil assembly 154 may be energized to induce axial movement of the piston 148 to trigger locking and unlocking of the differential. The piston 148 may therefore function as an armature, in one example. In particular, the coil assembly 154 may be selectively energized and de-energized to induce activation and deactivation of the electromagnetic solenoid actuator 102. Activation and deactivation of the solenoid actuator causes differential locking and unlocking.

In one example, the electromagnetic solenoid actuator 102 may be activated via a multi-stage control strategy. Therefore, in some instances, the solenoid actuator may, in a first stage, be energized with a higher current to induce movement of the piston 148 and in a second stage, current level may be reduced or stopped with the piston 148 in held or locked a desired position. Thus, in one specific embodiment, the solenoid actuator may be activated via a peak and hold strategy where the current delivered to the solenoid is stepped down during activation. When the circuit board assembly 104 is incorporated into the differential and manufactured therewith, the precision in solenoid actuator control may be increased, thereby increasing actuator performance and vehicle handling performance, correspondingly. Incorporating the circuit board assembly 104 into the differential further enables the circuit board assembly 104 to be more precisely calibrated when manufactured, in certain cases. For instance, a sole manufacturer may assemble the differential and control circuitry and then subsequently calibrate the control circuitry. Consequently, the precision in solenoid actuator control may be further increased, which increases actuator performance.

The electromagnetic solenoid actuator 102 may further include a washer 204. The washer 204 may function to axially retain components in the actuator. The solenoid actuator 102 may further include a housing assembly 206. The housing assembly 206 may include the housing 152 and the cover plate 153. When assembled, the electromagnetic solenoid actuator 102 is fluidly sealed within the housing 152 and the cover plate 153. In this way, the solenoid may be protected from lubricating fluid (e.g., oil) within the differential enclosure. The cover plate 153, in one example, includes a recess 211 profiled to mate with the sensor extension 213 of a circuit board assembly housing 226, expanded upon herein. In this way, the circuit board assembly may be sealed with the solenoid actuator 102. The recess 211 may have a shape which correlates to the shape of the sensor 140. As such, in one example, the recess may have two opposing walls 227 which are parallel to one another and profiled to seal the sensor. However, other recess shapes have been contemplated.

The coil assembly 154 may include the first face 142 (e.g., inner axial face), a second face 212 (e.g., outer axial face) opposite the first face, and an outer circumferential surface 214 extending between the first and second faces. These solenoid components may enclose coil windings which when energized cause the piston 148 to move in an axial direction.

The control circuit 144 is designed to implement control and diagnostic strategies. For instance, the control circuitry 144 may selectively energize the solenoid actuator to induce locking and unlocking of the differential based on one or more operating conditions. Various control and diagnostic strategies programmatically stored in the control circuitry 144 are discussed in greater detail herein with regard to FIGS. 3-11. To accomplish the control and diagnostic functionality the control circuitry 144 may include memory executable by a processor. The memory may store instructions executable by the processor to carry out the control methods, strategies, etc. described herein. To elaborate, the processor may include a microprocessor unit and/or other types of circuits. The memory may include known data storage mediums such as random access memory, read only memory, keep alive memory, combinations thereof, etc. The circuit board assembly 104 may be included in a controller 105 which further includes one or more input devices such a button, graphical user interface (GUI), knob, switch, slider, and the like which enable a system operator to initiate differential locking and unlocking functionality. Additionally or alternatively, the circuit board assembly 104 may be designed to programmatically lock and unlock the differential based on operating conditions such as vehicle speed, vehicle traction, vehicle load, and the like.

The housing 152 may include a cut-out 218 which extends through a circumferential surface 220 and an outer wall 222. The cut-out 218 mates and seals the circuit board assembly 104. In this way, circuit board assembly 104 may be space efficiently incorporated into the solenoid actuator while fluidly sealing the actuator from lubrication fluid present in the differential. The cut-out 218 may specifically include opposing walls 224. The profile of the walls 224 may correspond to the profile of the circuit board assembly housing 226. Specifically, in one example, the walls 224 may be parallel to one another to enable the circuit board assembly to be efficiently sealed with the solenoid actuator. However, other wall profiles have been envisioned. The actuator housing 152 may further include an inner circumferential extension 228 (e.g., annular extension) designed to mate with a section of the differential such as a differential case.

The control circuit 144 and the sensor 140 may form an L-shape, in one example. To elaborate, the sensor 140 may be arranged at a substantially perpendicular angle 230 to the control circuit 144. Thus, as shown the circuit board assembly 104 may include a continuous base 232 that comprises an upper section 234 and a side section 236 that radially extends towards the central axis 162. In this way, the sensor 140 may be arranged at a desired angle for sensing operation while allowing the control circuit to be spaced away from the solenoid coils which generate heat during operation.

The circuit board assembly 104 further includes the sealed housing 226 with a first section 238 which may have an L-shape profile corresponding to the L-shape of the underlying circuit board. The L-shaped housing allows the assembly to achieve a comparatively small package, sense solenoid actuator movement, and exhibit targeted thermal characteristics which reduces the heat of the circuit. A second section 240 (e.g., cover) may, when assembled, attach to the first section 238 to seal the circuit board therein. The second section 240 may include a planar face which increases heat transfer from the circuit to the surrounding environment while the housing achieves a space efficient profile. The second section 240 may mate in an opening 241 of the first section 238. The second section 240 further includes a planar top surface 243 which may be laterally aligned which allows the housing to transfer greater amounts of heat to the surrounding environment.

The housing 226 may include a wiring interface 242 (e.g., wiring harness). In one embodiment, the wiring interface 242 may be a controller area network (CAN) wiring interface with four wire ports 244, as illustrated. However, in other embodiments, the wiring interface 242 may be a local interconnect network (LIN) wiring interface with three wire ports (one signal wire, one power wire, and one ground wire). When a CAN wiring interface is deployed, degradation of the circuit board's components may be more easily identified. On other hand, when an LIN wiring interface is deployed, the likelihood of wire degradation is decreased, due to a reduction in wires and packaging of the circuit board assembly may be simplified, in certain scenarios. The wire ports 244 may be arranged along an axis parallel to the central axis 162. In this way, the circuit board assembly 104 may achieve a space efficient form which spaces the heat producing sections of the board away from the coil assembly 154 which generates heat during operation. Consequently, the chance of the circuit board assembly's temperature surpassing a desired value may be reduced.

The circuit board assembly 104 may further include wire seals 248 coupled to the wiring interface 242 to reduce the chance of lubricant interfering with the wiring and entering the circuit board enclosure. In this way, the assembly's longevity may be further increased.

FIGS. 3-7 shows a cross-section of a portion of the solenoid actuator 102 in various states. The figures start with a disengaged, and de-energized coil state at FIG. 3 and progresses through actuator operation including how internal friction is used to selectively lock a component of the actuator in an energized and extended position, which corresponds in this example to an engaged state of the torque transmitting element (e.g., the differential). FIGS. 3-7 progress through the maintenance of the extended position without coil activation, and through to unlocking and retraction back to the rest state. The control of the actuator by the control system may follow the routines of FIG. 8-10.

Figure 3:
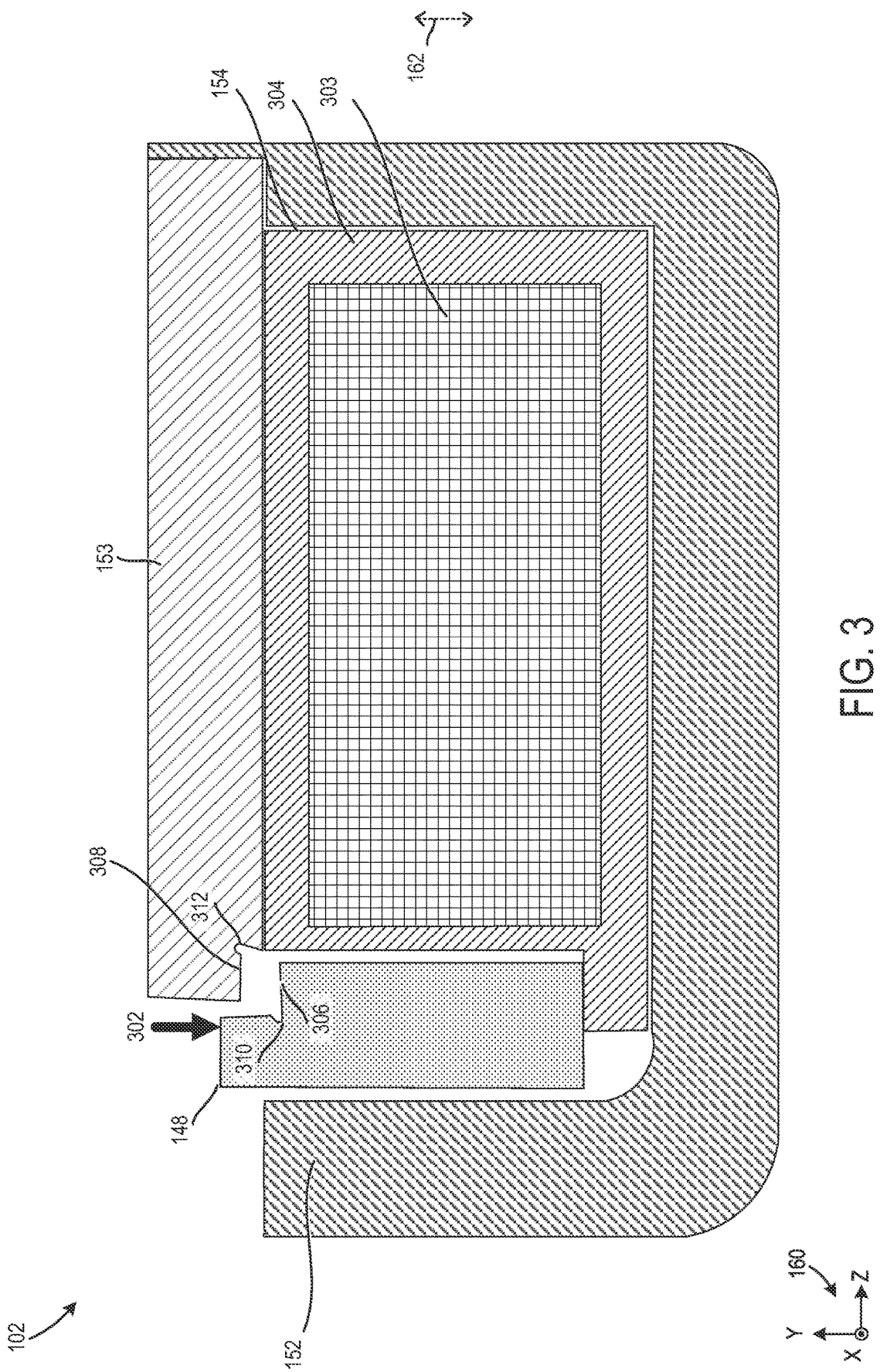
FIG. 3 shows a cross-section of a portion of the electromagnetic solenoid actuator of FIGS. 1-2 in a disengaged position.

Turning now to FIG. 3, it shows the solenoid actuator 102 in a de-energized (and unlocked state). As depicted, the electromagnetic solenoid actuator includes coil assembly 154 and the piston 148. Coil assembly 154 includes coil 303 and coil overmold 304. In one example, the piston 148 functions as a plunger. In one example, piston 148 may be designed with a piston surface 306 and the cover plate 153 may have a cover plate surface 308. The piston surface 306 may have a slight angle (e.g., greater than zero and less than 10%) upward from piston notch 310 relative to the x-z plane in the untilted position shown in FIG. 3, or may be flat in the x-z plane if the cover plate surface 308 has a slight angle upward from cover plate notch 312, or vice versa. Further still, both surfaces may be oppositely angled as illustrated in FIG. 3. In some examples, cover plate surface 308, or the piston surface 306, or both the cover plate surface 308 and the piston surface 306 are angled. In some examples, an entity between cover plate surface 308 and piston surface 306 (such as the washer 204 in FIG. 2) is angled.

In FIG. 3, without electrical current supplied to coil assembly 154, a downward spring force 302 acts to move the piston 148 axially along the central axis 162. In one example, the downward spring force 302 may be supplied by the spring of the previously described gear system, such as spring 131 of locking device 132 in FIG. 1. Continuing in this example, the downward spring force 302 acting on piston 148 maintains disengagement of gears in the differential system 100. In one example, a sensor, such as sensor 140, detects the unlocked position of piston 148 and communicates the unlocked position of piston 148 to controller 105.

Figure 4:
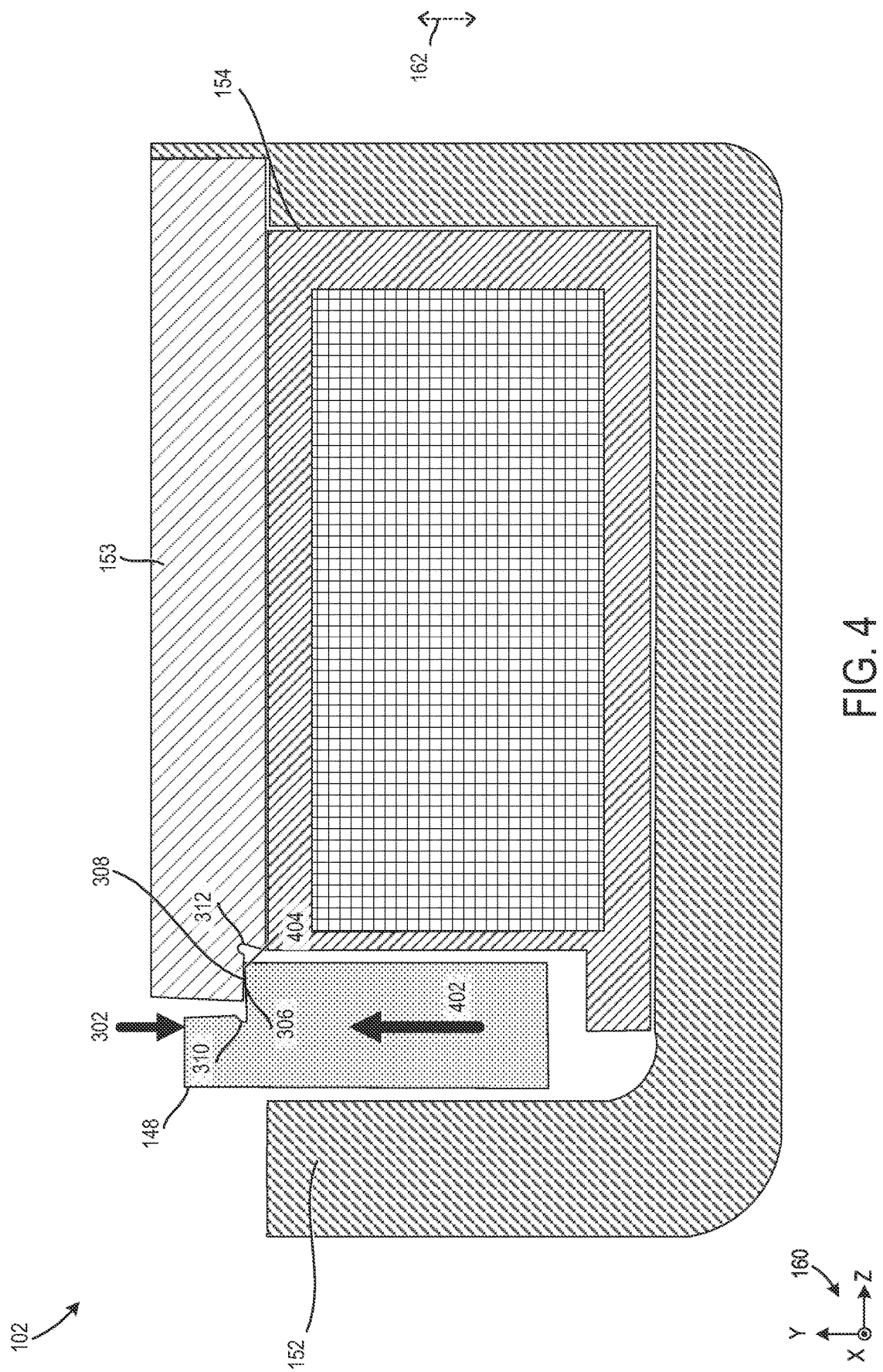
FIG. 4 shows the electromagnetic solenoid actuator, depicted in FIG. 3, energized.

FIG. 4 shows a detailed depiction of the electromagnetic solenoid actuator 102 with electrical current supplied to coil assembly 154 and the piston moving upward just until engagement at contact region 404. At this position, the piston 148 has not yet tilted or rotated, by a small angle is illustrated between surfaces 306 and 308. The energized coil assembly 154 generates a magnetic force 402. The forces acting on piston 148 thus include the magnetic force 402 upward parallel to central axis 162 and spring force 302 downward, also parallel to central axis 162. Magnetic force 402 overcomes the spring force 302 so that the piston moves linearly upward as the forces are not substantially offset from one another.

In one example, the controller determines the magnitude of current supplied to the coil assembly 154 to generate magnetic force 402 based a calibrated level, which may be adjusted depending on operating conditions. For example, the current level may be based on an estimate of the spring force, and may be adjusted based on operating temperature, or desired speed of engagement. Further, the current level may be adjusted based on learned values of current applied during previous operations, which may further be indexed as a function of temperature. Additional details are provided in the routines of FIGS. 8-10.

As noted above, magnetic force 402 induces linear translation of the piston 148, which in this example is parallel to the central axis of the actuator, until the protrusion of piston 148 makes contact with a point or region on cover plate 153. In one example, the piston surface 306 and cover plate surface 308 make angled contact at contact region 404, which may be represented by a contact point in one example. However, depending on the level of deformation, the contact may occur at a contract region around the initial contact point. Further, multiple contract points and/or regions may occur due to deformation, imperfections, and other geometrical consideration. Upon impact at the contact region 404, the piston 148 does not make flush contact with the cover plate 153, therefore the frictional forces is low. Tilting forces are generated as discussed further with regard to FIG. 5.

Figure 5:
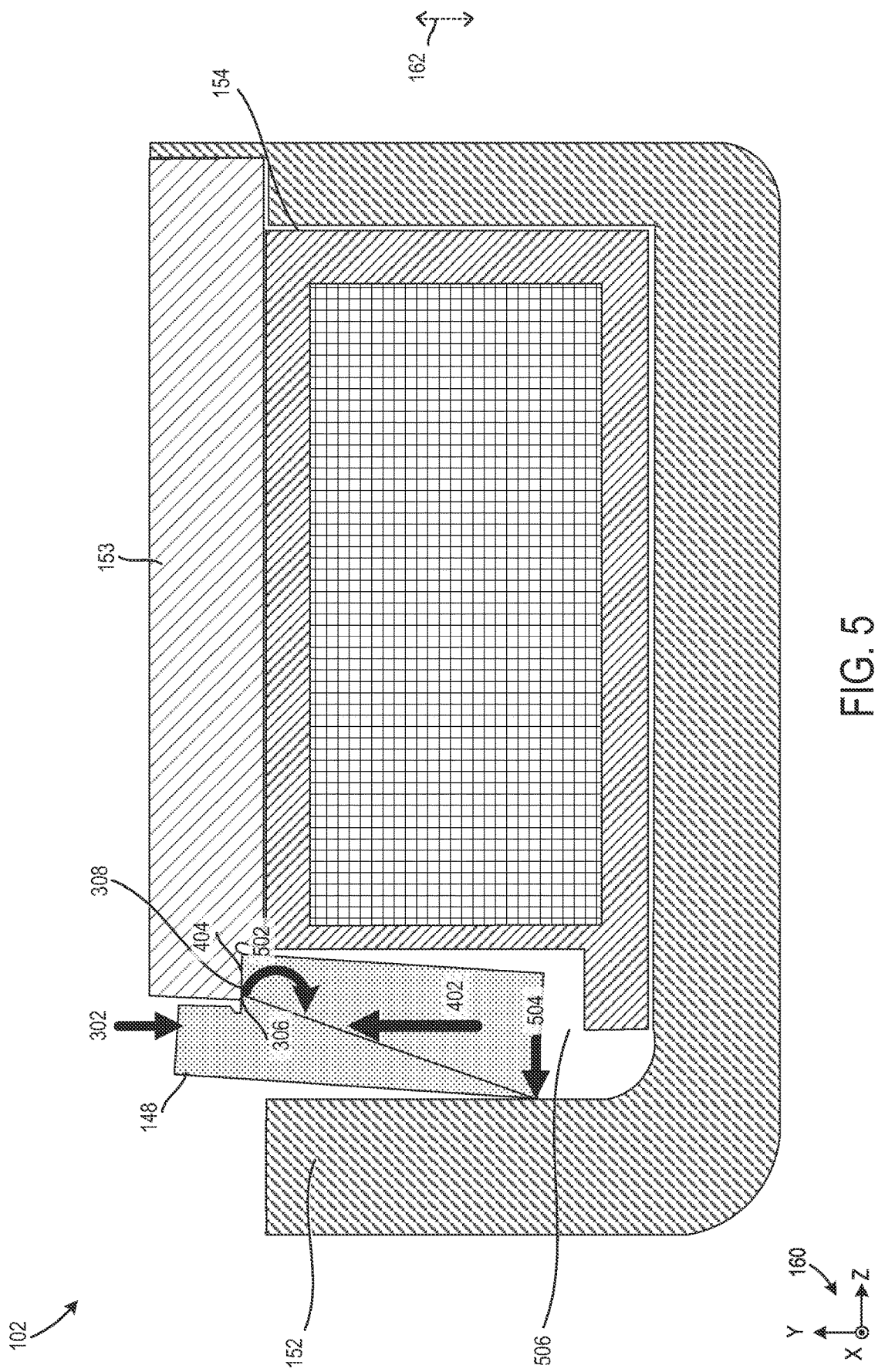
FIG. 5 shows the electromagnetic solenoid actuator, depicted in FIG. 3, energized and in locked position.

Specifically, FIG. 5 shows the electromagnetic solenoid actuator 102 with electrical current supplied to the coil assembly 154 and piston 148 in a frictional locking configuration. Current to the coil assembly 154 forces the piston 148 axially toward cover plate 153. Following the initial linear translation of the piston 148, piston surface 306 and the contact plate surface 308 try to make flush or face to face contact along contact region 404 causing piston 148 to tilt and frictional force to increase. Piston 148 attempts to mitigate the airgap 506. The attempt to mitigate airgap 506 and/or the offset contact forces and reaction normal and friction forces create moment 502 that is in a direction to rotate the piston 148. The unbalanced moment rotates or tilts the piston, which is enabled due to spaces created by angled surfaces in this example. In the positioning shown in FIG. 5, the small angle and resulting space between surfaces 306 and 308 is closed due to the rotation and thus the surfaces are in face-sharing contact. Further, the piston 148 makes contact with the housing 152 at a corner of the piston (near the point of arrow 504, for example). The moment acts to further increase the normal and frictional forces, creating a self-locking condition that is perpetuated with sustained current to wedge the piston 148 between housing 152 and cover plate 153. The increased normal force increases total frictional force between housing 152 and piston 148 generating frictional force 504, which is directly proportional to the normal force. At this point, the current can be reduced, such as to a lower level, or zero, while the piston remains locked in the position illustrated in FIG. 5 if the return spring force is insufficient to unlock it. However, if the piston is not sufficiently locked when current is reduced, the piston may start to move downward.

In some examples, the magnitude and duration of current sufficient to lock the piston 148 by friction is learned and stored in controller 105 as explained further in FIGS. 8-10.

Figure 6:
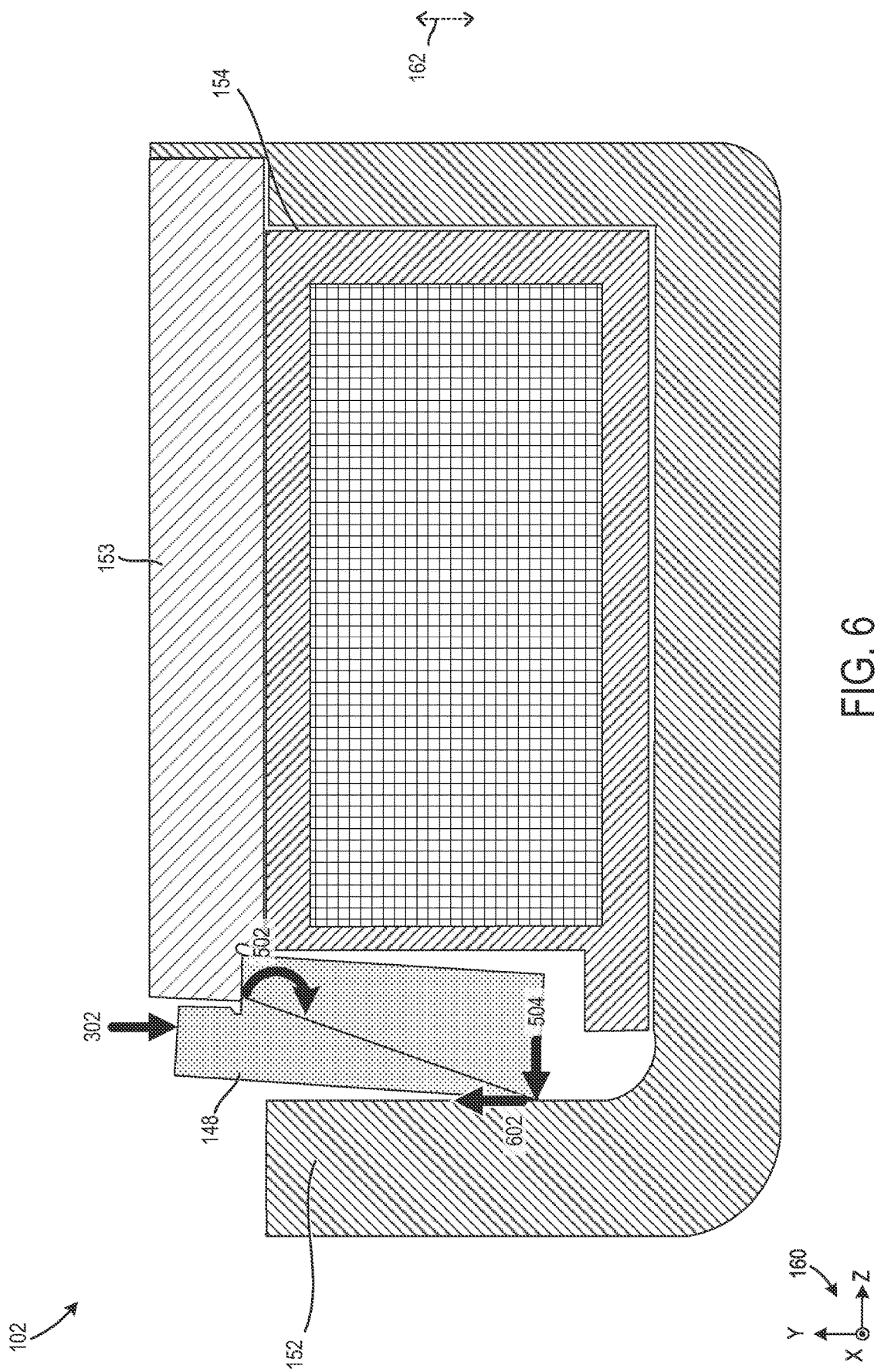
FIG. 6 shows the electromagnetic solenoid actuator, depicted in FIG. 3, in locked position with electrical current stopped.

FIG. 6 shows the electromagnetic solenoid actuator 102 in the frictional lock configuration without electrical current in the case where the operation at FIG. 5 was sufficient to lock the piston in place even when current is reduced. In particular, continuing from FIG. 5, FIG. 6 shows the situation where tilting the piston 148 via moment 502 locks the piston in place between the housing 152 and cover plate 153. The locking enables generation of frictional force 602, which is equal and opposite to spring force 302, holding piston 148 in place. At this point, current to the actuator may be stopped and the piston remains locked. Routines in FIGS. 8, 9, and 11 describe in more detail how current to the coil assembly 154 is reduced and stopped.

Figure 7:
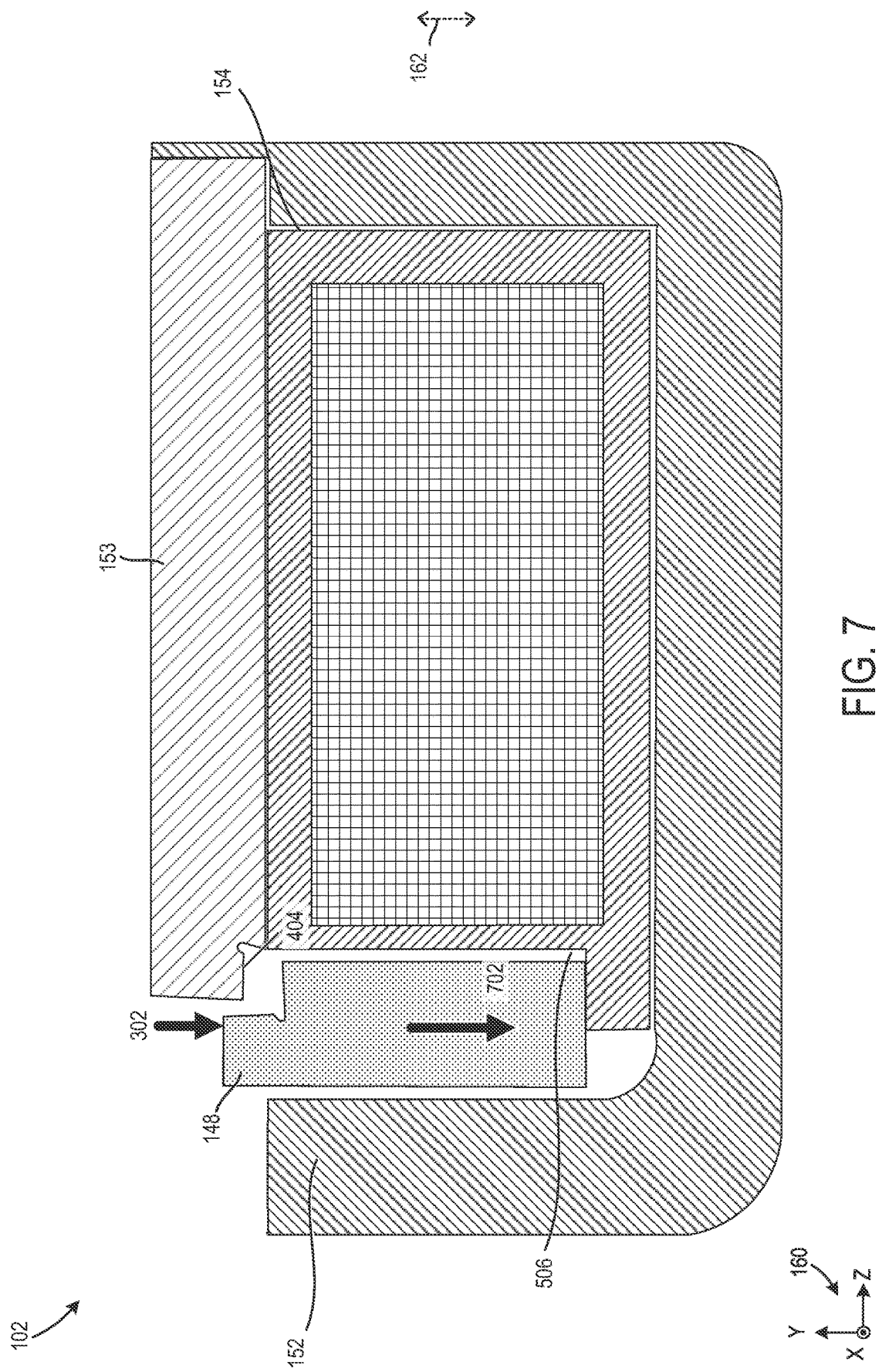
FIG. 7 shows the electromagnetic solenoid actuator, depicted in FIG. 3, disengaging frictional lock.

FIG. 7 shows the electromagnetic solenoid actuator 102 with electrical current supplied to the coil assembly 154 and the piston 148 disengaged from the frictional lock position. To disengage the frictional lock, electrical current to the coil assembly 154 may be supplied in an opposite direction to the engaging current, and at a magnitude and for a duration sufficient to return the piston to the untilted position so that linear motion can proceed back to the original position as illustrated in FIG. 7.

Opposite direction current energizes the coil assembly 154. Current is transmitted to the cover plate 153 urging the piston 148 from contact region 404 with opposite magnetic force 702. Opposite magnetic force 702, in combination with the spring force, pushes the piston 148 away from the cover plate 153 unlocking the piston. The unlocked piston 148 slides axially within airgap 506 further urged by spring force 302 in an unlocked direction. Once motion begins, opposite direction current to the coil assembly 154 may be reduced and stopped. The piston then remains in the unlocked position such as illustrated in FIG. 3.

In one example, the controller may determine the magnitude and duration of current supplied to the coil assembly 154 to generate opposite magnetic force 702 based a calibrated level, which may be adjusted depending on operating conditions. For example, the current level may be based on an estimate of the frictional force 602 and spring force 302, and may be adjusted based on operating temperature, or desired speed of engagement. Further, the current level may be adjusted based on learned values of current applied during previous operations, which may further be indexed as a function of temperature. Details are provided in the routines of FIGS. 8-10.

Turning now to FIGS. 8, 9 and 10, the method 800 and subroutines 900 and 1000 detail locking and unlocking the friction locked state of the solenoid actuator to engage and disengage a torque transmission member, respectively, and may be implemented by one or more of the differential systems and corresponding components, described above with regard to FIGS. 1-7. The method 800 may be carried out via a circuit board assembly incorporated in a differential system. Further, the circuit board assembly may include a controller including memory holding instructions executable via a processor, as previously discussed.

In one example, the method 800 uses feedback from a sensor (e.g. eddy current sensor 140 of FIG. 1) and a controller (e.g. 105) to determine the engagement state of the differential, e.g. engaged or disengaged and control the engagement and disengaged as requested by a vehicle level controller during vehicle operation. The method 800 proceeds to lock or unlock the solenoid actuator 102 following subroutines in FIGS. 9 and 10, which will be described in detail below. In one example, the routines of FIGS. 8, 9 and 10 also employ the position information to adaptively learn respective current levels and/or durations to lock and unlock the solenoid actuator. Current level supplied to the actuator may be further modified based on additional operating conditions of the vehicle in order to provide reliable and quick engagement and disengagement as requested without over drawing current.

The method 800 starts at 802, where the method includes determining operating conditions. The operating conditions may include ambient temperature, circuit board assembly temperature, electromagnetic solenoid actuator temperature, vehicle speed, vehicle load, operator input device configuration, etc. The operating conditions may be determined via one or more sensors.

The method 800 proceeds to 804, where the method includes determining a desired state of the system, such as a desired engagement or disengagement request of the differential. The vehicle controller may account for various factors when determining a desired differential state. For instance, a state change may be requested when a vehicle operator actuates a button, or other input device, indicating the operator's desire to lock the differential from an unlocked state. In other examples, a change of state may be desired when there is a vehicle traction imbalance between the drive wheels rotationally coupled to the differential. For instance, if drive wheel speed deviation surpasses a threshold value (e.g., 0.8 meters per second (m/s), 1.4 m/s, 2.2 m/s, etc.) differential locking may be initiated. In a different example, differential locking may be requested if a change in road conditions is detected. For example, if the vehicle leaves a highway and enters difficult terrain.

The method proceeds to 806, where the method includes determining whether the desired state is the actual current state. In one example, a sensor, such as sensor 10, provides the position of the plunger, e.g. piston 148, from which the method estimates the engagement state of the differential system.

If it is determined that a differential state change is not desired because the current state is the desired state (NO at 806), the method moves to 808 where the method includes maintaining the differential locking mechanism in the present configuration.

If it is determined that a state change is desired (YES at 806), the method 800 advances to 810. At 810, the method 800 includes determining whether the state change is a transition to lock. In one example, the sensor 140 detects the piston 148 in contact with housing 152 and no contact with the cover plate 153, as described in FIG. 7. In such an example, a state change from unlocked to lock may be determined.

If it is determined that the system requests to lock (YES at 810) the method 800 proceeds to 812 where a locking routine is carried out. The locking routine is further discussed in FIG. 9.

Returning to 810, if it is determined that the system does not request to lock (NO at 810) the system proceeds to transition to unlock (YES at 814). In one example, the piston 148 sensed in contact with the housing 152 and the cover plate 153, such as described in FIGS. 5 and 6, may determine a state change from locked to unlock. From 814, the method 800 proceeds to 816 to carry out the unlocking routine, which is described in FIG. 10.

Turning to FIG. 9, the method 900 describes a locking routine for the solenoid actuator. Conditions of the differential system, or other torque transmitting system, may affect the amount of current to lock the actuator. Therefore, in FIG. 9, a controller learns a magnitude and/or duration of current based on sensor feedback and stores the information as a threshold current level for subsequent locking control.

The method 900 starts at 902 where a flag condition is checked as to whether the locked flag is set to equal 1. The flag indicates the last known state of the clutch, with 1 meaning that the system is engaged and current has been reduced (actuator locked), and zero meaning that the system is disengaged. If it is determined that the flag is equal to one, the method 900 proceeds to return as the actuator is locked and the clutch is engaged.

If it is determined that flag is equal to zero, the method 900 proceeds to 904, where it is determined whether the plunger is in a fully extended position, which is a position where it may be locked in position if sufficiently tilted. In one example, determining the position of the plunger, such as the piston 148, may be detected by sensors, such as sensor 140 described above, and the method may include sending and/or receiving messages from a controller to the actuator, such as controller 105 and solenoid actuator 102. In one example, a duration where current is greater than a threshold magnitude is used to determine whether the piston is locked.

Thus in one example, if current at 1 ampere (A), or greater, is held for 70 milliseconds (ms), the piston may be assumed to be locked. In another example, speed deviation across the clutch below a threshold value (e. g., greater than 2.2 m/s, etc.) may indicate the lock state of the piston and clutch engagement.

If it is determined that the piston is in the position where it may be locked, the method 900 proceeds to 906 where current to the coil is reduced. In one example, current to the coil is reduced by 5 milliampere (mA) increments, and the increment held for 10 ms, while one or more sensors, such as described above, indicate whether the piston remains in the extended position. In this way, current is reduced while confirming that the piston stays in the desired position and is thus actually locked by friction.

The method 900 proceeds to 908 upon detection of the piston staying in position (is locked) at a reduced current, which may be zero current or current below a non-zero threshold such as 0.1 Amp. At 910 the flag is set equal to one and the current level to lock the piston is stored in memory as an updated lock current threshold, which may be filtered with a low pass filter to adaptively learn the current required to achieve satisfactory locking such that current can be reduced while maintaining engagement. Further the current level required to maintain locking of the actuator upon current removal may be learned as a function of operating conditions, such as temperature. In this way, as temperature may affect the spacing and friction in the actuator, different current levels may be required at different temperatures to maintain locking of the actuator upon current reduction. For example, at increased temperature, the available clearance space may be reduced, meaning a lower peak current level at the lock position can set the actuator into the locked stated that is maintained upon current reduction, as compared to lower temperatures.

Returning to 904, if it is determined that the piston is not in a locked position (NO at 904), the method 900 proceeds to 912, where current to the actuator is adjusted, e.g., increased, to move the piston towards the locked position.

From 912, the method 900 proceeds to 914 where the lock flag is set to zero.

Turning to FIG. 10, the method 1000 describes an unlocking routine for the solenoid actuator. Unlocking the solenoid actuator, to disengage the clutch for example, includes increasing current to the coil in an opposite direction to the engaging current which generates a downward force that is further aided by the downward axial force of the spring, as described in FIG. 7. As noted above, variable conditions may affect the amount of current to unlock the actuator. Therefore, in FIG. 10, a controller determines a selected current level and duration to apply based on operating conditions, and further adaptively updates the magnitude and/or duration of opposite direction current based on sensor feedback and stores the information as a threshold current level for subsequent unlocking control in the controller memory.

The method 1000 starts at 1002 where a flag condition is checked as to whether the locked flag is set to equal 1. As above, the flag indicates the last known state of the clutch, with 1 meaning that the system is engaged and current has been reduced (actuator locked), and zero meaning that the system is disengaged. If it is determined that the flag is equal to zero, the method 1000 proceeds to return as the actuator is unlocked and the clutch is disengaged.

If it is determined that flag is equal to 1, the method 1000 proceeds to 1004, where it is determined whether the plunger, e.g. piston 148, is in an unlocked position, e.g.

parallel to central axis 162, or locked, e.g. tilted, position. As above, determining the position of the piston 148, may be detected by sensors, such as sensor 140, and the method may include sending and/or receiving messages from a controller to the actuator, such as controller 105 and solenoid actuator 102. In one example, a duration where current in the opposite direction to the engaging current is greater than a threshold magnitude is used to determine whether the piston is unlocked. Thus in one example, if current at 0.6 ampere (A), or greater, in the opposite direction from the engaging current is held for 50 ms, the piston may be assumed to be unlocked.

If it is determined that the piston is in the unlocked position, the method 1000 proceeds to 1006 where current to the coil is reduced. In one example, current to the coil is reduced by 3 mA increments, and the increment held for 10 ms, while one or more sensors, such as described above, indicate whether the piston 148 remains in the unlocked position. In this way, current is reduced while confirming that the piston stays in the desired position and is thus actually in an unlocked state and gears disengaged.

The method 1000 proceeds to 1008 upon detection of the piston staying in position (is unlocked) at a reduced current, which may be zero current or current below a non-zero threshold such as 0.1 Amp. At 1010 the flag is set equal to zero and the current level to unlock the piston is stored in memory as an updated unlock current threshold, which may be filtered with a low pass filter to adaptively learn the current required to achieve satisfactory unlocking. In this way, as spring force may affect the current level to overcome the frictional force in the locked actuator, different current levels may be required for different temperatures to quickly and efficiently unlock the actuator.

Returning to 1004, if it is determined that the piston is not in an unlocked position, the method 1000 proceeds to 1012, where current to the actuator is adjusted, e.g., increased, to move the piston towards the unlocked position, which may also be included in the adaptive learning of the current required to unlock for the current conditions, such as temperature.

From 1012, the method 1000 proceeds to 1014 where the lock flag is set to 1.

FIG. 11 shows a timing diagram 1100 for example prophetic operation of an electromagnetic solenoid actuator to engage and disengage a torque transmission member of a vehicle transmission according to the methods of FIGS. 8-10. The horizontal (x-axis) denotes time and the vertical markers t1-t3 identify relevant times in the routines of FIGS. 8, 9 and 10 locking and unlocking the solenoid actuator. Dashed horizontal lines indicate current levels and/or piston positions in various scenarios.

Prior to t1, the solenoid actuator is in an unlocked state 1102. In one example, beginning at t1, a state change to locked is desired, as in FIG. 8. In one example, a clutch or gear engagement is requested. In one example, controller 105 in communication with a global positioning system (GPS) detect the vehicle 101 enter an area with difficult road conditions. In this example, the vehicle may be detected leaving a highway and entering an unimproved road corridor. Continuing in this example, the sensor 140 detects the unlocked position and, as described in FIG. 3, the piston is not tilted. At t1, current to the coil is increased based on the adaptive learning described in FIG. 9. For example, current may be supplied at an initial level 1104, e.g. 1 A, and then held for 5 ms based on a lock current threshold stored as flag equal to one. The locking mechanism transitions from an unlocked state to a locked state as indicated by the sensor detecting the position 1106 of the piston making contact with the cover plate and housing. Continuing in this example, detection of the piston in locked position initiates a reduction in current to the coil, such as described in FIG. 9. Current to the coil may be reduced as the sensor detects piston position. For example, current may be reduced at 0.2 A increments and held for 5 ms.

At t2, current to the coil is further reduced at 1108 towards the direction of stopping current to the coil. In one example, the sensor detects the piston unlocking, as indicated by 1110 in the position plot. Detection of unlocking initiates increasing current to the coil, shown at 1112 in the current plot. In one example, current level may be increased to the lock flag plus 0.2 A and held for 5 ms. In one example, sensors continue to monitor piston position while current is held until locking is detected again. Upon locked detection 1114, current may be reduced, as piston position is monitored. In one example, if piston position remains in the determined position as current is reduced, current may be reduced to zero.

At t3, a state change from locked to unlocked is desired, such as described in FIG. 8, and correspondingly, gear or clutch disengagement is requested. In one example, the controller 105 and GPS system detect the vehicle returning to the highway. After t3, current is supplied to the coil in an opposite direction to the engaging current to urge the piston from the cover plate, as described in FIG. 7. As described in the example routine of FIG. 10, current may be supplied at an initial level 1116 stored in the controller as the unlock current threshold. In one example, the current may be supplied at 1 A and held for 5 ms. Reverse current is reduced while sensors continue to sense piston position. Continuing in this example, reverse current supplied is at a lower magnitude than the threshold to move the piston to an unlocked position. In this example, sensors detect the piston is still locked. Reverse current is applied at a greater magnitude current level 1118. In one example, current may be applied at the unlock flag level, e.g. 1 A, plus 0.2 A, and held for 5 ms. In this example, the current is sufficient to unlock the piston and the spring restores the piston to axial orientation within the housing, as indicated by 1120 in the position plot. Following FIG. 10, the new current level to unlock the actuator may be stored in the controller as the unlock current threshold.

The systems and methods described herein have the technical effect of increasing the holding force of a solenoid actuator using frictional force. The systems and methods described herein may further have the technical effect of increasing the holding force of a solenoid actuator without increasing current.

FIGS. 1-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements coaxial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Elements having a continuous shape may be referred to as such, in on example. Further in another example, elements having a monolithic shape may be referred to as such. As used herein, the terms "substantially" and "approximately" are construed to mean plus or minus five percent or less of the range or value unless otherwise specified.

The disclosure also provides support for a method, comprising: operating a solenoid actuator to engage and/or disengage a torque transmission member of a vehicle transmission, the solenoid actuator including a translatable structural element to effect the engagement and/or disengagement, where the translatable structural element is linearly moved until it touches a surface that creates a moment that tilts the structural element to lock the structural element in place.

In a first example of the method, operating the solenoid actuator includes increasing a current magnitude, and then reducing the current magnitude but with the structural element still locked in place.

In a second example of the method, optionally including the first example, the structural element is a pole-piece.

In a third example of the method, optionally including one or both of the first and second examples, the structural element is a plunger.

In a fourth example of the method, optionally including one or more or each of the first through third examples, the structural element is a cover plate.

In a fifth example of the method, optionally including one or more or each of the first through fourth examples, the engagement and/or disengagement includes engagement and/or disengagement of a gear in a transmission.

In a sixth example of the method, optionally including one or more or each of the first through fifth examples, the engagement and/or disengagement includes engagement and/or disengagement of a clutch in a differential.

The disclosure also provides support for a solenoid actuator, comprising: a housing, a coil positioned in the housing, a plunger positioned in the housing, wherein the plunger includes a contact region. The plunger configured to tilt upon the contact region contacting a portion of a structure fixed with the housing.

In a first example of the system, the structure is a plate fixed to the housing, the plate having a protrusion, wherein the contact region is offset from a centroid of a cross-section of the plunger.

In a second example of the system, optionally including the first example, the plunger includes a cut-out forming the contact region.

In a third example of the system, optionally including one or both of the first and second examples, the housing is shaped as an annulus.

In a fourth example of the system, optionally including one or more or each of the first through third examples, the system further comprises: a spring urging the plunger in an unlocked direction.

In a fifth example of the system, optionally including one or more or each of the first through fourth examples, the plunger is coupled in a vehicle transmission component.

The disclosure also provides support for a method, comprising: increasing current to a solenoid actuator to engage a torque transmission member of a vehicle transmission, including: first linearly translating a translatable structural element against a spring, and second, after initial linear translation, tilting the translatable structural element to lock the translatable structural element in place, and reduce the current while friction maintains the translatable structural element to maintain engagement of the torque transmission member.

In a first example of the method, the method further comprises: learning a current level required to lock the translatable structural element.

In a second example of the method, optionally including the first example, the method further comprises: disengaging the torque transmission member, including: increasing current, in an opposite direction to the engaging current, to the solenoid actuator to unlock the translatable structural element, and then linearly translating the translatable structural element assisted by the spring.

In a third example of the method, optionally including one or both of the first and second examples, the method further comprises: learning a current level required to un-lock the translatable structural element.

In a fourth example of the method, optionally including one or more or each of the first through third examples, the method further comprises: determining position of the translatable structural element and adjusting the current in response to the determined position of the translatable structural element.

In a fifth example of the method, optionally including one or more or each of the first through fourth examples, reducing the current includes reducing the current to zero while maintaining the torque transmission member engaged.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various vehicle system configurations. The control methods and routines disclosed herein may be stored as executable instructions in non-transitory memory and may be carried out by the control system including the controller in combination with the various sensors, actuators, and other system hardware. The specific routines described herein may represent one or more of any number of processing strategies. As such, various commands, operations, and/or actions described herein may be performed in the sequence illustrated, in tandem, or in some cases omitted. Likewise, the order of processing is provided for ease of description and is not necessarily required to achieve the features and advantages of the examples described herein. One or more of the actions, operations, and/or functions, described herein may be repeatedly performed depending on the particular strategy being used. Further, the described actions, operations, and/or functions may graphically represent code to be programmed into non-transitory memory of the computer readable storage medium in a differential control system, where the described actions are carried out by executing the instructions in a system including the various hardware components in combination with the electronic controller.

It will be appreciated that the configurations and routines disclosed herein are exemplary in nature, and that these specific examples are not to be considered in a limiting sense, because numerous variations are possible. For example, the above technology may be applied to motor systems with different configurations and in a vehicle with a variety of propulsion sources such as motors, engines, combinations thereof, etc. Moreover, the terms "first," "second," "third," and the like are not intended to denote any order, position, quantity, or importance, but rather are used merely as labels to distinguish one element from another, unless explicitly stated to the contrary. The subject matter of the present disclosure includes all novel and non-obvious combinations and sub-combinations of the various systems and configurations, and other functions, features, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither excluding nor requiring two or more such elements. Other combinations and sub-combinations of the disclosed features, functions, elements, and/or properties may be claimed through amendment of the present claims or through presentation of new claims in this or a related application. Such claims, whether narrower, broader, equal, or different in scope to the original claims, also are regarded as included within the subject matter of the present disclosure.

The invention claimed is:

1. A method, comprising:
engaging a torque transmission member of a vehicle transmission via a solenoid actuator, the solenoid actuator including a translatable structural element to effect the engagement, where the translatable structural element is linearly moved along a central axis until it touches a surface, wherein contact between the translatable structural element and the surface creates a moment that tilts the structural element along a tilt axis to lock the structural element in place via a frictional force, the tilt axis offset from the central axis.

2. The method of claim 1, wherein engaging the torque transmission member includes increasing a current magnitude, and then reducing the current magnitude but with the structural element still locked in place via the frictional force.

3. The method of claim 1, wherein the structural element is a pole-piece.

4. The method of claim 1, wherein the structural element is a plunger.

5. The method of claim 1, wherein the structural element is a cover plate.

6. The method of claim 1, wherein the engagement includes engagement of a gear in a transmission or a clutch in a differential.

7. A method, comprising:
increasing current to a solenoid actuator to engage a torque transmission member of a vehicle transmission, including:
first linearly translating a translatable structural element against a spring, wherein the translatable structural element is an armature, and
second, after initial linear translation, tilting the translatable structural element to lock the translatable structural element in place; and
reducing the current while friction maintains the translatable structural element to maintain engagement of the torque transmission member.

8. The method of claim 7, further comprising learning a current level required to bring the translatable structural element to a locked position of engagement.

9. The method of claim 7, further comprising disengaging the torque transmission member, including:
increasing current, in an opposite direction to the engaging current, to the solenoid actuator to unlock the translatable structural element, and then linearly translating the translatable structural element assisted by the spring.

10. The method of claim 9, further comprising learning a current level required to release the translatable structural element from the locked position of engagement.

11. The method of claim 9, further comprising determining position of the translatable structural element and adjusting the current in response to the determined position of the translatable structural element.

12. The method of claim 11, wherein reducing the current includes reducing the current to zero while maintaining the torque transmission member engaged.

13. The method of claim 1, wherein the translatable structural element is an armature.

* * * * *